United States Patent
Wu

(10) Patent No.: US 12,299,378 B2
(45) Date of Patent: May 13, 2025

(54) METHOD, DEVICE OF DETERMINING A STYLE FOR A WEB PAGE ELEMENT, AND STORAGE MEDIUM

(71) Applicant: BEIJING ZITIAO NETWORK TECHNOLOGY CO., LTD., Beijing (CN)

(72) Inventor: Lingjiang Wu, Beijing (CN)

(73) Assignee: BEIJING ZITIAO NETWORK TECHNOLOGY CO., LTD., Beijing (CN)

(*) Notice: Subject to any disclaimer, the term of this patent is extended or adjusted under 35 U.S.C. 154(b) by 165 days.

(21) Appl. No.: 18/057,845

(22) Filed: Nov. 22, 2022

(65) Prior Publication Data
US 2023/0222283 A1 Jul. 13, 2023

(30) Foreign Application Priority Data
Jan. 10, 2022 (CN) .......................... 202210022316.5

(51) Int. Cl.
*G06F 40/14* (2020.01)
*G06F 40/137* (2020.01)

(52) U.S. Cl.
CPC ............ *G06F 40/14* (2020.01); *G06F 40/137* (2020.01)

(58) Field of Classification Search
None
See application file for complete search history.

(56) References Cited

U.S. PATENT DOCUMENTS

| | | | | |
|---|---|---|---|---|
| 9,104,527 B2* | 8/2015 | Gould | ..................... | G06F 17/00 |
| 10,042,935 B1* | 8/2018 | Perkins | ................. | G06F 16/532 |
| 10,534,830 B2* | 1/2020 | Fanning | ................ | G06F 16/986 |
| 10,789,413 B2* | 9/2020 | Lenzner | ............... | G06F 3/04847 |
| 11,734,496 B2* | 8/2023 | Barker | ................ | G06F 16/9538 |
| | | | | 715/234 |
| 12,008,219 B2* | 6/2024 | Xiong | ................... | G06F 40/129 |
| 2009/0303676 A1* | 12/2009 | Behar | ..................... | H04L 67/02 |
| | | | | 707/E17.014 |

(Continued)

FOREIGN PATENT DOCUMENTS

| CN | 106293669 A | 1/2017 |
|---|---|---|
| CN | 111523067 A | 8/2020 |

(Continued)

OTHER PUBLICATIONS

International Search Report issued May 22, 2023 in International Application No. PCT/CN2023/070603, with English translation (5 pages).

*Primary Examiner* — Maikhanh Nguyen

(57) ABSTRACT

The present disclosure relates to style determination method, apparatus, device, storage medium and program product. The method comprises: acquiring a style file associated with a child element, wherein the style file associated with the child element comprises one or more of: a style file corresponding to the child element, a style file corresponding to a root element of the child element, and a style file corresponding to an element on an element chain between the child element and the root element; acquiring first style information corresponding to the child element from at least one or more of the style files; determining a target style information corresponding to the child element based on at least one or more the first style information.

9 Claims, 4 Drawing Sheets

(56) References Cited

U.S. PATENT DOCUMENTS

| | | | | |
|---|---|---|---|---|
| 2012/0110433 A1* | 5/2012 | Pan | ............... | G06F 40/103 |
| | | | | 715/234 |
| 2013/0339844 A1* | 12/2013 | Guzman | ............... | G06F 40/154 |
| | | | | 715/235 |
| 2016/0275052 A1* | 9/2016 | Eicholz | ............... | G06F 40/137 |
| 2016/0275053 A1* | 9/2016 | Eicholz | ............... | G06F 40/137 |
| 2017/0102927 A1* | 4/2017 | Gunther, Jr. | ............... | G06F 8/38 |
| 2018/0210864 A1* | 7/2018 | Zhang | ............... | G06F 40/30 |
| 2020/0125631 A1* | 4/2020 | Seel | ............... | G06F 40/154 |

FOREIGN PATENT DOCUMENTS

| | | | |
|---|---|---|---|
| CN | 111984262 | A | 11/2020 |
| CN | 112231281 | A | 1/2021 |
| CN | 113190781 | A | 7/2021 |

\* cited by examiner

METHOD, DEVICE OF DETERMINING A STYLE FOR A WEB PAGE ELEMENT, AND STORAGE MEDIUM

CROSS-REFERENCE OF RELATED APPLICATION

This disclosure claims the priority of a Chinese patent application No. 202210022316.5 filed in China Patent Office on Jan. 10, 2022, which is hereby incorporated by reference in its entirety.

FIELD OF THE INVENTION

The present disclosure relates to the technical field of data processing, in particular to style determination method, apparatus, device, storage medium and program product.

BACKGROUND

During development of the front-end of World Wide Web (i.e., Web), it is necessary to design, for an element in a web page, its corresponding style file.

The existing namespace for style files is of global type, which causes namespace pollution of class names used for specified styles among modules, and a globally unique style sheet is too bulky and has an unclear hierarchical structure, and is difficult to reuse.

BRIEF SUMMARY OF THE INVENTION

In order to solve the above technical problems, the embodiments of the present disclosure provide style determination method, apparatus, device, storage medium and program product, which can avoid the problem of namespace pollution of class names among modules, lead to that the class names have a clear hierarchical structure and are convenient to reuse.

In a first aspect, an embodiment of the present disclosure provides a style determination method, which includes:
  acquiring a style file associated with a child element, wherein the style file associated with the child element comprises one or more of: a style file corresponding to the child element, a style file corresponding to a root element of the child element, and a style file corresponding to an element on an element chain between the child element and the root element;
  acquiring first style information corresponding to the child element from at least one or more of the style files;
  determining a target style information corresponding to the child element based on at least one or more the first style information.

In a second aspect, an embodiment of the present disclosure provides a style determination apparatus, which includes:
  a style file acquision module, for acquiring a style file associated with a child element, wherein the style file associated with the child element comprises one or more of: a style file corresponding to the child element, a style file corresponding to a root element of the child element, and a style file corresponding to an element on an element chain between the child element and the root element;
  a first style information acquision module, for acquiring first style information corresponding to the child element from at least one or more of the style files;
  a target style information determination module, for determining a target style information corresponding to the child element based on at least one or more the first style information.

In a third aspect, an embodiment of the present disclosure provides an electronic device including:
  one or more processors;
  a storage device for storing one or more programs;
  the one or moe programs, when executed by the one or more processors, cause the one or more processors to implement the style determination method as described in any one of the above first aspect.

In a fourth aspect, an embodiment of the present disclosure provides a computer-readable storage medium on which computer programs are stored, wherein the computer programs, when executed by a processor, implement the style determination method as described in any one of the above first aspect.

In a fifth aspect, an embodiment of the present disclosure provides a computer program product, which includes computer programs or instructions that, when executed by a processor, implement the style determination method as described in any one of the above first aspect.

The disclosed embodiment provides style determination method, apparatus, device, storage medium and program product. The method comprises: acquiring a style file associated with a child element, wherein the style file associated with the child element comprises one or more of: a style file corresponding to the child element, a style file corresponding to a root element of the child element, and a style file corresponding to an element on an element chain between the child element and the root element; acquiring first style information corresponding to the child element from at least one or more of the style files; determining a target style information corresponding to the child element based on at least one or more the first style information. In the technical solution provided by the embodiments of the present disclosure, target styles for child elements can be determined by style files associated with the child elements, which can avoid the problem of namespace pollution of class names among modules, lead to that the class names have a clear hierarchical structure and are convenient to reuse.

DESCRIPTION OF THE DRAWINGS

The above and other features, advantages and aspects of various embodiments of the present disclosure will become more apparent when taken in conjunction with the accompanying drawings and with reference to the following detailed description. Throughout the drawings, the same or similar reference numerals refer to the same or similar elements. It should be understood that the drawings are schematic and the originals and elements are not necessarily drawn to scale.

DETAILED DESCRIPTION OF PREFERRED EMBODIMENTS

Figure 1:
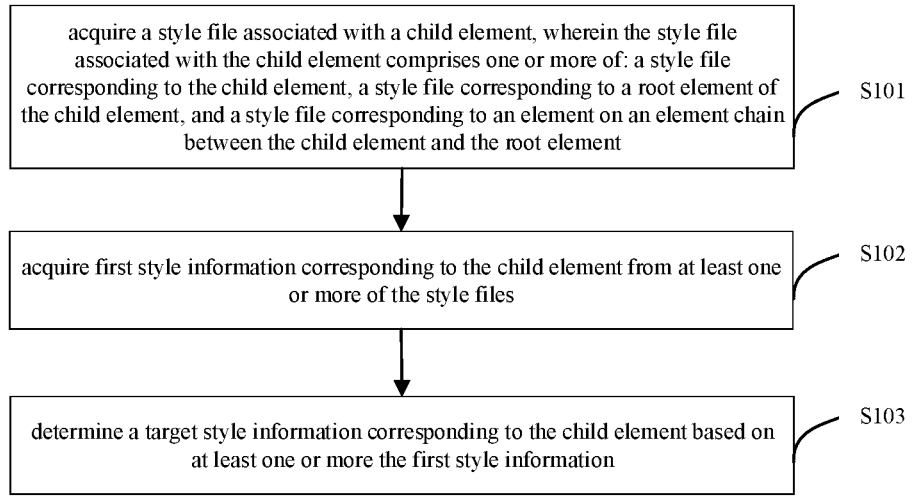
FIG. 1 is a flowchart of a style determination method according to an embodiment of the present disclosure.

Embodiments of the present disclosure will be described in more detail below with reference to the accompanying drawings. Although some embodiments of the present disclosure are shown in the drawings, it should be understood that the present disclosure can be implemented in various forms and should not be construed as limited to the embodiments set forth here. On the contrary, these embodiments are provided for a more thorough and complete understanding of the present disclosure. It should be understood that the drawings and embodiments of this disclosure are only for illustrative purposes, and are not intended to limit the scope of protection of this disclosure.

It should be understood that the steps described in the method embodiments of the present disclosure can be performed in different order and/or in parallel. In addition, the method embodiments may include additional steps and/or omit the steps shown. The scope of the present disclosure is not limited in this respect.

As used herein, the term "including" and its variations are open including, that is, "including but not limited to". The term "based on" means "based at least in part". The term "one embodiment" means "at least one embodiment"; The term "another embodiment" means "at least one other embodiment"; The term "some embodiments" means "at least some embodiments". Relevant definitions of other terms will be given in the following description.

It should be noted that the concepts of "first" and "second" mentioned in this disclosure are only used to distinguish different devices, modules or units, and are not used to limit the order or interdependence of the functions performed by these devices, modules or units.

It should be noted that the modifications of "one" and "multiple" mentioned in this disclosure are illustrative rather than restrictive, and those skilled in the art should understand that unless the context clearly indicates otherwise, they should be interpreted as "one or more".

The names of messages or information exchanged between multiple devices in this embodiment are only for illustrative purposes, and are not intended to limit the scope of these messages or information.

During development of the front-end of World Wide Web (i.e., Web), it is necessary to design, for an element in a web page, its corresponding style file. At present, the commonly used style file editing methods are: Block Element Modifier (BEM) nomenclature and Cascading Style Sheets (CSS) module.

Among them, BEM nomenclature refers to naming of Block, Element and Modifier through BEM, such as <image class=image1></image> and <image class=image2></image>; image1 and image2 respectively represent two picture elements in an interface, and corresponding styleSheets are designed for image1 and image2 respectively. This naming method can make the hierarchical structure of CSS codes to be clear and solve the problem of naming conflict to a certain extent. However, BEM naming method only belongs to a naming constraint, and it can still run even if it is not written according to the specification, so it can't eliminate the problem of naming conflict.

Among them, cascading style sheet module introduces css codes like js codes, and each class name in the code is an attribute of the introduced object. In this way, the referenced css style can be clearly specified during usage. And the css module, when being packaged, will automatically convert the class name into a hash value, which can completely eliminate the problem of CSS class name conflict. But CSS modules can't be used directly, but need to be packaged.

To solve the above problems, the embodiment of the present disclosure provides a style determination method, which determines target styles for child elements through the style files associated with child elements, thus avoiding the problem of namespace pollution of class names among modules, lead to that the class names have a clear hierarchical structure and are convenient to reuse.

The style determination method according to embodiments of the present application will be described in detail below with reference to the drawings.

FIG. 1 is a flowchart of a style determination method according to an embodiment of the present disclosure. This embodiment can be applied to a case of designing a style sheet for page elements. The method can be executed by a style determination apparatus, which can be implemented by software and/or hardware, and which can be equipped in an electronic device.

For example, the electronic device can be a mobile terminal, a fixed terminal or a portable terminal, such as mobile phone, site, unit, device, multimedia computer, multimedia tablet, Internet node, communicator, desktop computer, laptop computer, notebook computers, netbook computer, tablet computer, personal communication system (PCS) device, personal navigation device, personal digital assistant (PDA), audio/video player, digital camera/video camera, positioning device, television receiver, radio broadcast receiver, electronic book device, gaming device, and arbitrary combination thereof, including accessories and peripherals for such devices or their arbitrary combination.

For another example, the electronic device may be a server, wherein the server may be a physical server or a cloud server, and the server may be a single server or a server cluster.

As shown in FIG. 1, the style determination method according to the embodiment of the present disclosure mainly includes the following steps:

S101. acquire a style file associated with a child element, wherein the style file associated with the child element comprises one or more of: a style file corresponding to the child element, a style file corresponding to a root element of the child element, and a style file corresponding to an element on an element chain between the child element and the root element.

Figure 2:
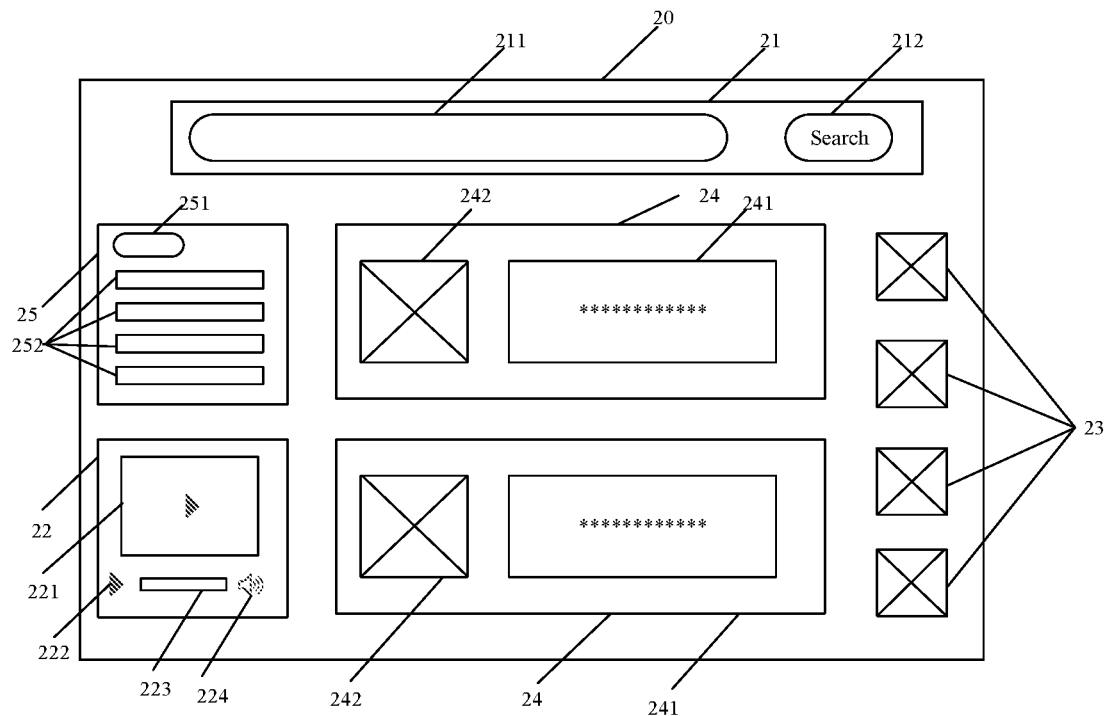
FIG. 2 is a schematic diagram of page components according to an embodiment of the present disclosure.

FIG. 2 is a schematic diagram of a page component according to the embodiment of the present disclosure. As shown in FIG. 2, a page component 20 includes a search box 21, an audio and video playing box 22, a plurality of picture display boxes 23, a plurality of basic content boxes 24 and an index box 25. The search box 21 includes a search input box 211 and a search button box 212; the audio and video playing box 22 includes a play main interface box 221, a play button box 222, a progress bar box 223 and a volume adjustment button box 224; the basic content box 24 includes a text display box 241 and a picture display box 242; and the index box 25 includes an index title box 251 and a plurality of index entry boxes 252.

Among them, each display box in the page component 20 can be referred to as an element. Wherein a child element is defined relative to a parent element. For example, the search input box 211 and the search button box 212 are child elements of the search box 21, which is a child element of the page component 20. The audio and video displayingbox 22 includes the main interface box 221, the play button box 222, the progress bar box 223 and the volume adjustment button box 224 which are child elements of the audio and video play box 22, which is a child element of the page component 20.

Among them, a style file corresponding to a child element refers to a style file bound to the child element; a style file corresponding to a root element refers to a style file bound to the root element; a style file corresponding to an element in an element chain refers to a style file bound to the element in the element chain.

In this embodiment, the style file corresponding to a child element can be interpreted as the style file of a child element being bound to the child element, and the binding can be interpreted as the style file being only valid for the child element bound therewith, but invalid for other elements.

For example:
<div styleSheet=styleSheet1>
  <image class=image1></image>
</div>
<div styleSheet=styleSheet2>
  <image class=image1></image>
</div>

Among them, image1 in the second line of code can be image1 in the title, which can be interpreted as a child element, and image1 in the fourth line of code can be image1 in the text, which can also be interpreted as a child element.

A style file styleSheet1 is bound to image1 in the title, and a style file styleSheet2 is bound to image1 in the body. That is, the style file styleSheet1 takes effect on the image1 in the title, that is, the image1 in the title can be rendered according to style information in the style file styleSheet1 and then be displayed. The style file styleSheet2 takes effect on image1 in the text, that is, image1 in the text can be rendered according to style information in the style file styleSheet2 and then be displayed. In this way, by binding style files and elements, the problem of naming conflict can be solved and the problem of namespace pollution can be effectively avoided.

Furthermore, the style file styleSheet1 can also be bound to other child elements, such as: <div styleSheet=styleSheet1>
  <image class=image2></image>
</div>

Among them, image2 can be another child element in the text, and the above binding relationship means that the stylesheet styleSheet1 takes effect on another child element image2 in the text. In this way, the style sheet can be reused conveniently.

Furthermore, the relationship among elements in the whole page can be converted into a tree structure, in which the root element can be a page element, for example, the rectangular box for the whole page component, and the child elements are other partial components in the page.

In this embodiment, a style file corresponding to the root element may be that the root element is bound to the style file. The specific binding method is the same as the above binding method for the child element and style file. The details can refer to the description in the above embodiment, which will not be repeated in this embodiment.

In this embodiment, an element chain between the child element and the root element can be interpreted as a chain composed of a series of elements between the child element and the root element, and the elements in the element chain have a parent-child relationship.

The style files corresponding to the elements in the element chain can be that the elements in the element chain being bound to the style files. The specific binding method is the same as the above binding method for the child element and style file. The details can refer to the description in the above embodiment, which will not be repeated in this embodiment.

In this embodiment, elements in each level have corresponding style files, and the child elements in a lower level can obtain the style files corresponding to elements in a higher level. For example, in a three-level tree structure including a root element, parent elements and child elements, the child elements will obtain their own corresponding style files, the style files corresponding to the parent elements and the style file corresponding to the root element.

S102, acquire first style information corresponding to the child element from at least one or more of the style files.

Among them, the style file can also be referred to as a style sheet, which mainly includes styles corresponding to respective elements, for example, style information about the length, height, border color, background color, texture, etc. of a rectangular box. The first style information can be interpreted as the style information directly acquired from the style file.

For example: stylesheet1.image1{width: 100px, height: 100px,}can be referred to as a style file, which indicates that the width and height of the rectangular box corresponding to the element image1 are 100px and 100px, respectively. Another example is: stylesheet2.image2 {width: 50px, height: 50px,}which indicates that the rectangular box corresponding to the element image2 is 50px wide and 50px high.

Furthermore, in step S101, the style file associated with the child element is acquired. In this embodiment, the style information is acquired from the style file as the first style information corresponding to the child element.

In this embodiment, if for a child element, there are multiple corresponding style files (its own corresponding style file, a style file corresponding to the root element, and a style file corresponding to an element in the element chain), the style information in each style file is acquired.

S103. determine a target style information corresponding to the child element based on at least one or more the first style information.

Among them, the style information at least comprises a style name and a style value; for example, in the style information {width: 100px}, the style name is width and the style value is 100px. Among them, the target style information can be interpreted as the style information to be used in the subsequent rendering of the page.

In this embodiment, determining the target style information corresponding to the child element based on one first style information can be interpreted as directly determining the first style information as the target style information corresponding to the child element.

Furthermore, determining the target style information corresponding to the child element based on a plurality of the first style information can be interpreted as merging a plurality of the first style information as the target style information corresponding to the child element. For example, a plurality of style information {width: 100px}{height: 100px} and {Color: '#ff0000'} are merged as the target style information corresponding to the child element.

In a possible implementation, determining the target style information corresponding to the child element based on a plurality of the first style information includes merging a plurality of the first style information level by level based on the hierarchical relationship between the elements, to obtain the target style information corresponding to the child element.

In this embodiment, first, the first style information in the style file bound to a child element is merged with the first style information in the style file corresponding to the parent element of the child element, and then merged with the first style information in the style file corresponding to the parent element of the parent element, and then subsequentially merged up level by level, until it is merged into the first style information in the style file corresponding to the root element of the child element.

For example, the element hierarchy in the tree structure is root element A-parent element B-parent element C-parent element D-child element E. The root element A corresponds to the first style information a, the parent element B corresponds to the first style information b, the parent element C corresponds to the first style information c, the parent element D corresponds to the first style information d, and the child element E corresponds to the first style information e. When a plurality of first style information are merged, the first style information e corresponding to the child element E and the first style information d corresponding to the parent element D are first merged to obtain style information (e, d); then merged with the first style information c corresponding to the parent element C to obtain style information (e, d, c); then merged with the first style information b corresponding to the parent element B to obtain style information (e, d, c, b); finally merged with the first style information a corresponding to the root element A to obtain the target style information (e, d, c, b, a).

It should be noted that, in the above example, the description is made by taking a style file corresponding to an element including only one first style information as an example, but in practical application, a style file may include multiple first style information, and the principle of level-by-level merging is the same.

In this way, the method of merging style information according to the hierarchy can avoid omission of style information.

Further, merging a plurality of the first style information level by level based on the hierarchical relationship between the elements, to obtain the target style information corresponding to the child element, including: in the process of merging a plurality of first style information level by level, if the first style information with the same style name exists, determining the first style information in a specific style file as the target style information corresponding to the child element, wherein the specific style file refers to a style file corresponding to an element in the element chain closest to the child element.

For example, {width: 100px} and {width: 50px} are the first style information with the same style name.

In this embodiment, the above example is used to explain that the first style information e corresponding to the child element E is merged with the first style information d corresponding to the parent element D. If the style names of the first style information e and the first style information d are the same, for example, the style names are width, but the style values are different. At this time, the first style information e is determined as the target style information corresponding to the child element.

For example, first, the first style information e corresponding to the child element E is merged with the first style information d corresponding to the parent element D to obtain the style information (e, d); then merged with the first style information c corresponding to the parent element C to obtain style information (e, d, c); then merged with the first style information b corresponding to the parent element B, at this time, if the style names of the first style information b and the first style information d are the same, the first style information d is determined as the target style information corresponding to the child element.

In this merging manner, a style file closer to the child element is assigned a higher priority. Setting the priorities of the style files can make the merged target style file more accurate and avoid the conflict of style information.

The disclosed embodiment provides style determination method, apparatus, device, storage medium and program product. The method comprises: acquiring a style file associated with a child element, wherein the style file associated with the child element comprises one or more of: a style file corresponding to the child element, a style file corresponding to a root element of the child element, and a style file corresponding to an element on an element chain between the child element and the root element; acquiring first style information corresponding to the child element from at least one or more of the style files; determining a target style information corresponding to the child element based on at least one or more the first style information. In the technical solution provided by the embodiments of the present disclosure, target styles for child elements can be determined by style files associated with the child elements, which can avoid the problem of namespace pollution of class names among modules, lead to that the class names have a clear hierarchical structure and are convenient to reuse.

Figure 3:
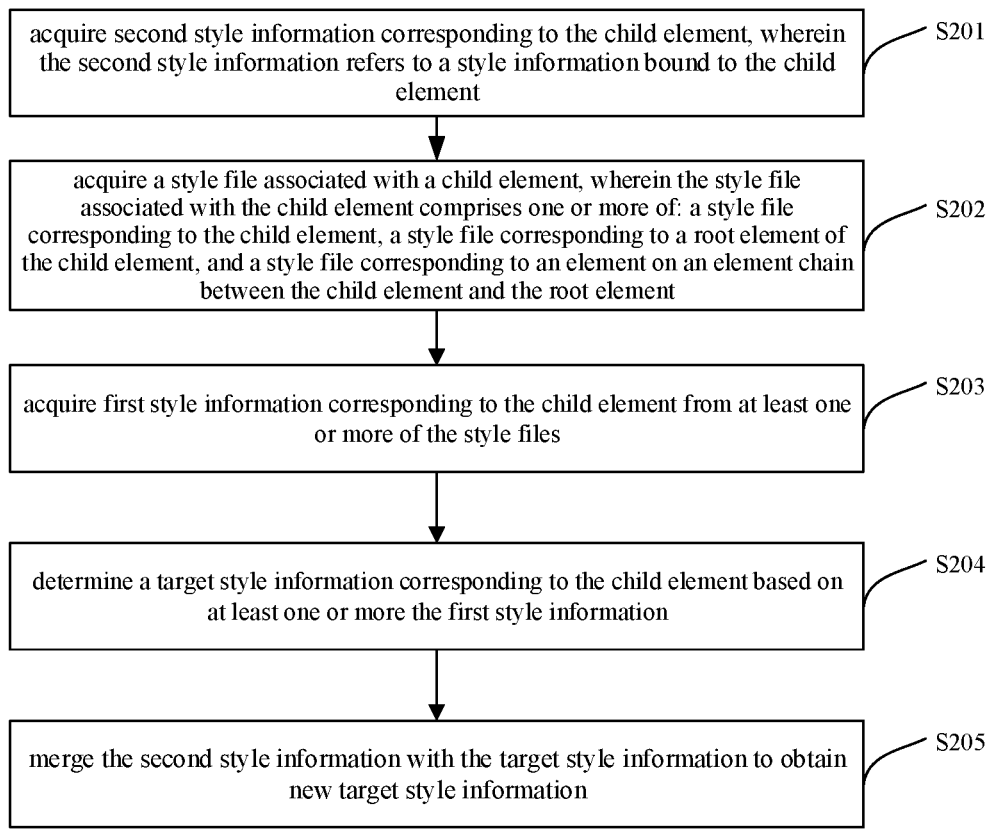
FIG. 3 is a flowchart of another style determination method according to an embodiment of the present disclosure.

On the basis of the above embodiments, the embodiment of the present disclosure further optimizes the style determination method. As shown in FIG. 3, the optimization of some style determination methods in the embodiments of the present disclosure mainly includes the following steps:

S201. acquire second style information corresponding to the child element, wherein the second style information refers to a style information bound to the child element.

Wherein, the second style information can be interpreted as style information directly bound to the child element.

For example: classNames=['image 1']style={borderColor: 'blue'}><UIView style={width: 90px, height: 90px}>, which indicates the second style information bound to the child element bordered is {borderColor:' blue'} and {width: 90px, height: 90px}.

In this embodiment, the code file can be parsed to obtain the second style information corresponding to the child element.

S202. acquire a style file associated with a child element, wherein the style file associated with the child element comprises one or more of: a style file corresponding to the child element, a style file corresponding to a root element of the child element, and a style file corresponding to an element on an element chain between the child element and the root element.

S203. acquire first style information corresponding to the child element from at least one or more of the style files.

S204. determine a target style information corresponding to the child element based on at least one or more the first style information.

Steps S202-S204 in this embodiment have the same content as those in S101-S103 in the above-mentioned embodiment. The details can refer to the description in the above embodiment, which will not be repeated in this embodiment.

S205, merge the second style information with the target style information to obtain new target style information.

For example, the second style information can be {borderColor: 'blue'}, and the target style information is {width: 100px, height:100px}, so the new target style information after merging is {borderColor: 'blue'} and {width:100px, height: 100px}.

In a possible implementation, merging the second style information with the target style information to obtain new target style information includes: if the style names of the second style information and the target style information are the same, determining the second style information as the new target style information.

For example, the second style information is {width:90px, height:90px} and the target style information is {width: 100px, height: 100px}, they have the same style names, so the second style information {width:90px, height:90px} is determined as the new target style information.

In a possible implementation, if for a child element, only the second style information exists, and there is no style file associated with the child element, the second style information is directly determined as the target style information.

In this embodiment, style information can be set for child elements separately, so as to realize separate style design for elements.

On the basis of the above embodiment, after the target style information is determined, if there is a style information without a specific style value, then the style value of the style information in the parent element is preferentially inherited. If the parent element also has no specific style value for this style information, the style value can be set as a default value.

Figure 4:
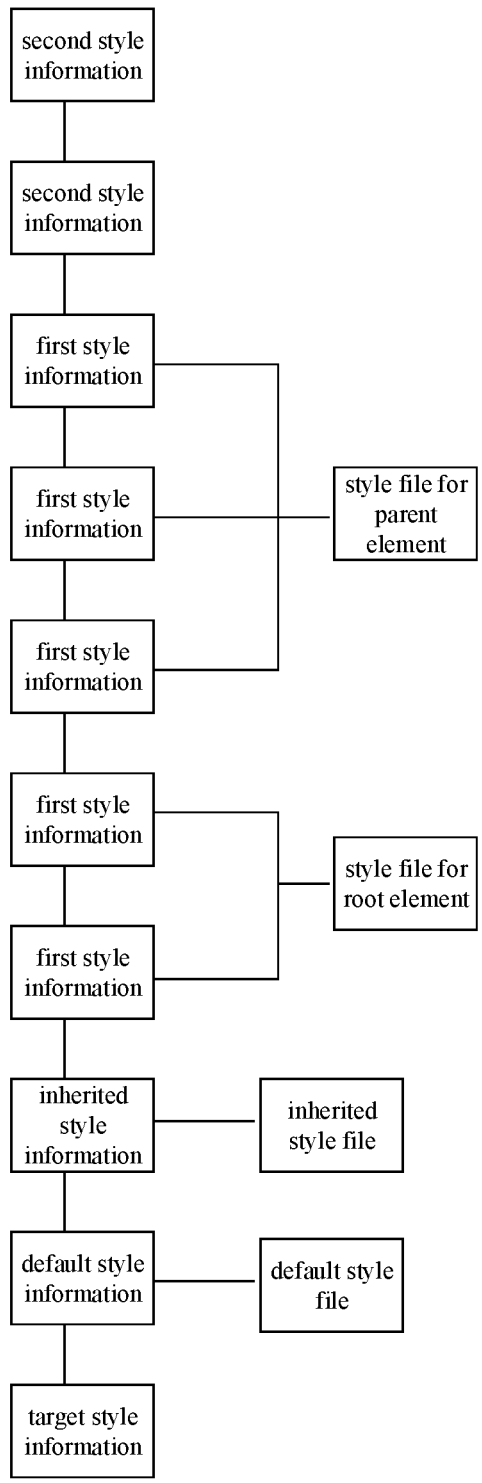
FIG. 4 is a flowchart of another element style determination method according to an embodiment of the present disclosure.

On the basis of the above embodiments, an embodiment of the present disclosure provide a specific example of determining element styles. As shown in FIG. 4, the main process of determining element styles provided by this embodiment includes: obtaining two second style information, then obtaining three first style information from the style file corresponding to the parent element, merging the two second style information with the three first style information corresponding to the parent element, then obtaining two first style information from the style file corresponding to the root element, and merging the two second style information, the three first style information corresponding to the parent element, and the two first style information corresponding to the root element, to obtain the merged style information. Specific merging rules can refer to the description in the above embodiment. After the merged style information is determined, if there is a style information with no specific style value, the style value of the style information in the parent element will be preferentially inherited. If the parent element also has no specific style value for this style information, then this style value can be set as a default value.

Figure 5:
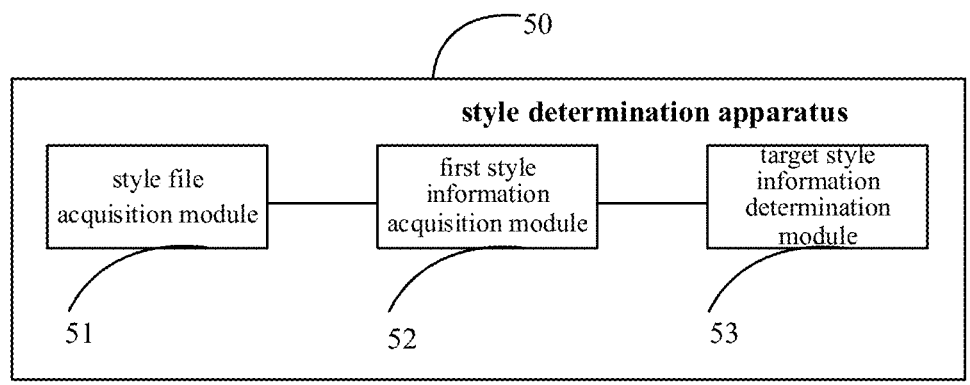
FIG. 5 is a schematic structural diagram of a style determination apparatus according to an embodiment of the present disclosure.

FIG. 5 is a structural schematic diagram of a style determination apparatus according to the embodiment of the present disclosure. This embodiment can be applied to a case of designing a style sheet for page elements. The style determination apparatus can be implemented by software and/or hardware, and can be equipped in an electronic device.

As shown in FIG. 5, the style determination apparatus provided by the embodiment of the present disclosure mainly includes a style file acquisition module 51, a first style information acquisition module 52 and a target style information determination module 53.

Among them, the style file acquisition module 51 is configured to acquire a style file associated with a child element, wherein the style file associated with the child element comprises one or more of: a style file corresponding to the child element, a style file corresponding to a root element of the child element, and a style file corresponding to an element on an element chain between the child element and the root element;

The first style information acquisition module 52 is configured to acquire first style information corresponding to the child element from at least one or more of the style files;

The target style information determination module 53 is configured to determine a target style information corresponding to the child element based on at least one or more the first style information.

Further, the target style information determining module 53 is specifically configured to merge a plurality of the first style information level by level based on the hierarchical relationship between the elements, to obtain the target style information corresponding to the child element.

Specifically, the target style information determining module 53 is specifically configured to in the process of merging a plurality of first style information level by level, if the first style information with the same style name exist, determine the first style information in a specific style file as the target style information corresponding to the child element, wherein the specific style file refers to first style information included in a style file corresponding to an element in the element chain closest to the child element.

Optionally, a style file corresponding to a child element refers to a style file bound to the child element; a style file corresponding to a root element refers to a style file bound to the root element; a style file corresponding to an element in an element chain refers to a style file bound to the element in the element chain.

Furthermore, the apparatus further comprises:
a second style information acquisition module, configured to acquire second style information corresponding to the child element, wherein the second style information refers to a style information bound to the child element.

The target style information determination module 53 is further configured to merge the second style information with the target style information to obtain new target style information.

Furthermore, the target style information determining module 53 is specifically configured to determine the second style information as the new target style information if the style names of the second style information and the target style information are the same.

The style determination apparatus provided by the embodiment of the present disclosure can execute the steps executed in the style determination method provided by the method embodiment of the present disclosure, and the specific implementation steps and advantageous effects are not repeated here.

Figure 6:
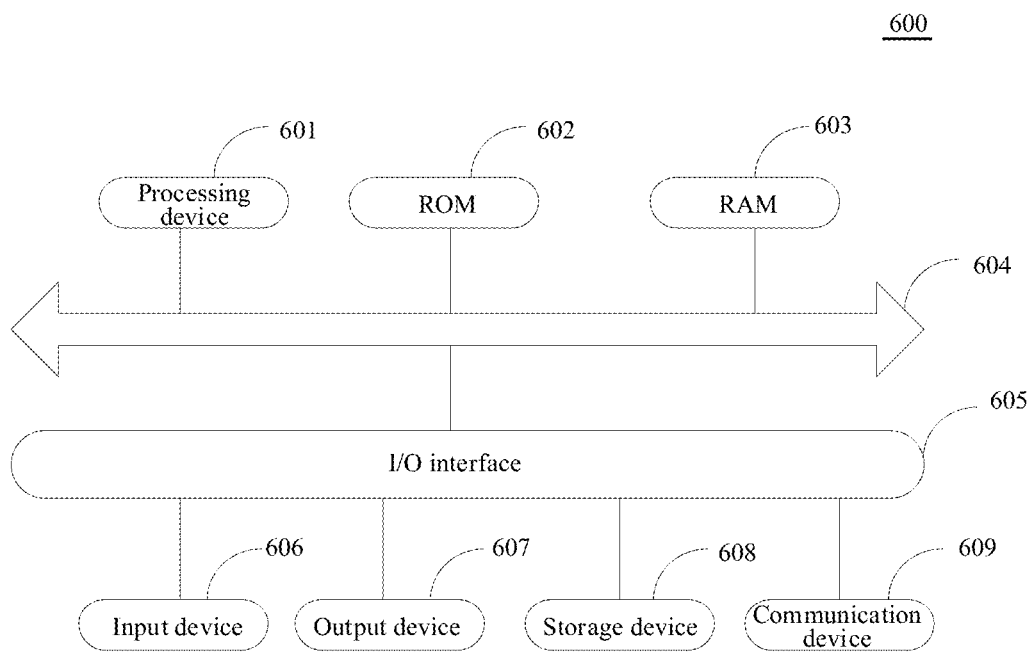
FIG. 6 is a schematic structural diagram of an electronic device according to an embodiment of the present disclosure.

FIG. 6 illustrates a schematic structural diagram of an electronic device in an embodiment of the present disclosure. Referring to FIG. 6 below, which illustrates a schematic structural diagram of an electronic device 600 suitable for implementing the embodiments of the present disclosure. The electronic device 600 in the present disclosure can comprise, but not limited to, for example, mobile terminals such as mobile phones, notebook computers, digital broadcast receivers, PDAs (personal digital assistants), PADs (tablet computers), PMP (portable multimedia players), vehicle-mounted terminals (for example, vehicle navigation terminals), and fixed terminals such as digital TVs, desktop computers, intelligent home equipments and the like. The electronic device shown in FIG. 6 is only an example, and should not bring any limitation to the functions and application scopes of the embodiments of the present disclosure.

As shown in FIG. 6, the electronic device 600 may include a processing device (such as a central processing unit, a graphics processor, etc.) 601, which may perform various appropriate actions and processes according to a program stored in a read-only memory (ROM)602 or a program loaded into a random access memory (RAM)603 from a storage device 608. In the RAM 603, various programs and data required for the operation of the electronic device 600 are also stored. The processing device 601, the ROM 602, and the RAM 603 are connected to each other through a bus 604. An input/output (I/O) interface 605 is also connected to the bus 604.

Generally, the following devices can be connected to the I/O interface 605: an input device 606 including, for example, a touch screen, a touch panel, a keyboard, a mouse, a camera, a microphone, an accelerometer, a gyroscope, and the like; an output device 607 including, for example, a liquid crystal display (LCD), a speaker, a vibrator and the like; a storage device 608 including, for example, a magnetic tape, a hard disk, etc.; and a communication device 609. The communication device 609 may allow the electronic device 600 to perform wireless or wired communication with other devices so as to exchange data. Although FIG. 6 shows an electronic device 600 with various components, it should be understood that it is not required to implement or have all the devices shown. More or fewer devices may be implemented or provided instead.

Particularly, according to the embodiments of the present disclosure, the process described above with reference to the flowchart can be implemented as a computer software program. For example, embodiments of the present disclosure include a computer program product, which can include a computer program carried on a non-transitory computer readable medium, the computer program containing program codes for executing the method shown in the flowchart. In such an embodiment, the computer program can be downloaded and installed from the network via the communication device 609, or installed from the storage device 608 or installed from the ROM 602. When the computer program is executed by the processing device 601, the above functions defined in the methods of the embodiments of the present disclosure can be executed.

It should be noted that the above-mentioned computer-readable media of this disclosure can be computer-readable signal media or computer-readable storage media or any combination of the above two. The computer-readable storage medium can be, for example, but not limited to, an electrical, magnetic, optical, electromagnetic, infrared, or semiconductor system, apparatus or device, or any combination of the above. More specific examples of computer-readable storage media may include, but not limited to, an electrical connection with one or more wires, a portable computer diskette, a hard disk, a random access memory (RAM), a read-only memory (ROM), an erasable programmable read-only memory (EPROM or flash memory), an optical fiber, a portable compact disk read-only memory (CD-ROM), an optical storage device, a magnetic storage device, or any suitable combination of the above. In this disclosure, the computer-readable storage medium can be any tangible medium that contains or stores a program that can be used by or in connection with an instruction execution system, apparatus or device. In this disclosure, however, the computer-readable signal media may include data signals propagated in baseband or as part of a carrier wave, in which computer-readable program codes are carried. This propagated data signal can take various forms, including but not limited to, electromagnetic signal, optical signal or any suitable combination of the above. The computer-readable signal medium can also be any computer-readable medium other than the computer-readable storage medium, which can send, propagate or transport a program for use by or in connection with the instruction execution system, apparatus or device. The program codes contained on the computer readable medium can be transmitted via any suitable medium, including but not limited to electric wire, optical cable, RF (radio frequency), etc., or any suitable combination of the above.

In some embodiments, a client and a server can communicate by using any currently known or future developed network protocol such as HTTP (HyperText Transfer Protocol), and can be interconnected with any form or medium of digital data communication (e.g., communication network). Examples of communication networks include local area networks ("LANs"), wide area networks ("WANs"), the internet network (e.g., the Internet) and end-to-end networks (e.g., ad hoc end-to-end networks), as well as any currently known or future developed networks.

The computer readable medium may be included in the electronic device; or it can exist separately without being assembled into the electronic device.

The computer-readable medium carries one or more programs which, when executed by the electronic device, cause the electronic device to acquire a style file associated with a child element, wherein the style file associated with the child element comprises one or more of: a style file corresponding to the child element, a style file corresponding to a root element of the child element, and a style file corresponding to an element on an element chain between the child element and the root element; acquire first style information corresponding to the child element from at least one or more of the style files; and determine a target style information corresponding to the child element based on at least one or more the first style information.

Optionally, when the one or more programs as mentioned above is to be executed by the terminal device, the terminal device can perform other steps in the above embodiments.

Computer program codes for performing the operations of the present disclosure can be written in one or more programming languages or their combinations, including but not limited to object-oriented programming languages such as Java, Smalltalk, C++, and conventional procedural programming languages such as "C" language or similar programming languages. The program can be executed completely on the user's computer, partially on the user's computer, as an independent software package, partially on the user's computer, partially on a remote computer, or completely on a remote computer or server. In the case of remote computer, the remote computer can be connected to the user computer through any kind of network, including local area network (LAN) or wide area network (WAN), or it can be connected to an external computer (for example, using an Internet service provider to connect through the Internet).

The flowchart and block diagram in the drawings illustrate the architecture, functions and operations of possible implementations of systems, methods and computer program products according to various embodiments of the present disclosure. In this regard, each block in the flowchart or block diagram may represent a module, program segment, or part of code, which contains one or more executable instructions for implementing the specified logical functions. It should also be noted that in some alternative implementations, the functions labelled in the blocks may also occur in a different order than those labelled in the drawings. For example, two consecutive blocks can actually be executed basically in parallel, and sometimes they can be executed in reverse order, depending on the functions involved. It should also be noted that each block in the block diagram and/or flowchart, and the combination of blocks in the block diagram and/or flowchart, can be implemented by a dedicated hardware-based system that performs specified functions or operations, or can be implemented by a combination of dedicated hardware and computer instructions.

The units involved in the embodiments described in this disclosure can be implemented by software or hardware. In some cases, the name of a unit does not constitute a restriction on the unit itself.

The functions described above in this paper can be at least partially performed by one or more hardware logic components. For example, without limitation, exemplary types of hardware logic components that can be used may include: Field Programmable Gate Array (FPGA), Application Specific Integrated Circuit (ASIC), Application Specific Standard Product (ASSP), System-on-Chip (SOC), Complex Programmable Logic Device (CPLD), etc.

In the context of this disclosure, a machine-readable medium can be a tangible medium that can contain or store a program for use by or in connection with an instruction execution system, apparatus or device. The machine-readable medium may be a machine-readable signal medium or a machine-readable storage medium. Machine-readable media can include, but not limited to, electronic, magnetic, optical, electromagnetic, infrared, or semiconductor systems, apparatuses or devices, or any suitable combination of the above. More specific examples of machine-readable storage media will include electrical connection based on one or more wires, portable computer disk, hard disk, random access memory (RAM), read-only memory (ROM), erasable programmable read-only memory (EPROM or flash memory), optical fiber, compact disk read-only memory (CD-ROM), optical storage device, magnetic storage device, or any suitable combination of the above.

According to one or more embodiments of the present disclosure, the present disclosure provides a style determination method, which includes: acquiring a style file associated with a child element, wherein the style file associated with the child element comprises one or more of: a style file corresponding to the child element, a style file corresponding to a root element of the child element, and a style file corresponding to an element on an element chain between the child element and the root element; acquiring first style information corresponding to the child element from at least one or more of the style files; determining a target style information corresponding to the child element based on at least one or more the first style information.

According to one or more embodiments of the present disclosure, the present disclosure provides a style determination method, and the determining a target style information corresponding to the child element based on at least one or more the first style information, includes: merging a plurality of the first style information level by level based on the hierarchical relationship between the elements, to obtain the target style information corresponding to the child element.

According to one or more embodiments of the present disclosure, the present disclosure provides a style determination method, and the merging a plurality of the first style information level by level based on the hierarchical relationship between the elements, to obtain the target style information corresponding to the child element, includes: in the process of merging a plurality of first style information level by level, if the first style information with the same style name exist, determine the first style information in a specific style file as the target style information corresponding to the child element, wherein the specific style file refers to first style information included in a style file corresponding to an element in the element chain closest to the child element.

According to one or more embodiments of the present disclosure, the present disclosure provides a style determination method, including: a style file corresponding to a child element refers to a style file bound to the child element; a style file corresponding to a root element refers to a style file bound to the root element; a style file corresponding to an element in an element chain refers to a style file bound to the element in the element chain.

According to one or more embodiments of the present disclosure, the present disclosure provides a style determination method, further including: acquire second style information corresponding to the child element, wherein the second style information refers to a style information bound to the child element, and merging the second style information and the target style information, to obtain a new target style information.

According to one or more embodiments of the present disclosure, the present disclosure provides a style determination method, the merging the second style information and the target style information, to obtain a new target style information, includes: determine the second style information as the new target style information if the style names of the second style information and the target style information are the same.

According to one or more embodiments of the present disclosure, the present disclosure provides a style determination apparatus, comprising a style file acquisition module configured to acquire a style file associated with a child element, wherein the style file associated with the child element comprises one or more of: a style file corresponding to the child element, a style file corresponding to a root element of the child element, and a style file corresponding to an element on an element chain between the child element and the root element; a first style information acquisition module configured to acquire first style information corresponding to the child element from at least one or more of the style files; and a target style information determination module configured to determine a target style information corresponding to the child element based on at least one or more the first style information.

According to one or more embodiments of the present disclosure, the present disclosure provides a style determination apparatus, the target style information determination module is configured to merge a plurality of the first style information level by level based on the hierarchical relationship between the elements, to obtain the target style information corresponding to the child element.

According to one or more embodiments of the present disclosure, the present disclosure provides a style determination apparatus, the target style information determining module is specifically configured to in the process of merging a plurality of first style information level by level, if the first style information with the same style name exist, determine the first style information in a specific style file as the target style information corresponding to the child element, wherein the specific style file refers to first style information included in a style file corresponding to an element in the element chain closest to the child element.

According to one or more embodiments of the present disclosure, the present disclosure provides a style determination apparatus, a style file corresponding to a child element refers to a style file bound to the child element; a style file corresponding to a root element refers to a style file bound to the root element; a style file corresponding to an element in an element chain refers to a style file bound to the element in the element chain.

According to one or more embodiments of the present disclosure, the present disclosure provides a style determination apparatus, further comprises: a second style information acquisition module, configured to acquire second style information corresponding to the child element, wherein the second style information refers to a style information bound to the child element, and the target style information determination module is further configured to merge the second style information with the target style information to obtain new target style information.

According to one or more embodiments of the present disclosure, the present disclosure provides a style determination apparatus, the target style information determining module is specifically configured to determine the second style information as the new target style information if the style names of the second style information and the target style information are the same.

According to one or more embodiments of the present disclosure, the present disclosure provides an electronic device including:
one or more processors;
a storage device for storing one or more programs;
the one or more programs, when executed by the one or more processors, cause the one or more processors to implement any style determination method as provided by the present disclosure.

According to one or more embodiments of the present disclosure, the present disclosure provides a computer-readable storage medium storing computer program instructions thereon, which, when executed by a processor, can implement any style determination method as provided by the present disclosure.

The embodiments of the present disclosure also provides a program product including computer program or instructions, which, when executed by a processor, cause implement the style determination method as discussed above.

The above description is only the embodiment of the present disclosure and the explanation of the applied technical principle. It should be understood by those skilled in the art that the disclosure scope involved in this disclosure is not limited to the technical scheme formed by the specific combination of the above technical features, but also encompasses other technical schemes formed by any combination of the above technical features or their equivalent features without departing from the above disclosed concept. For example, the technical solution formed by exchanging the above features with technical features with similar functions disclosed in (but not limited to) this disclosure.

In addition, although the operations are depicted in a specific order, this should not be interpreted as requiring these operations to be performed in the specific order shown or in a sequential order. Under certain circumstances, multitasking and parallel processing may be beneficial. Similarly, although several specific implementation details are included in the above discussion, these should not be interpreted as limiting the scope of the present disclosure. Some features described in the context of separate embodiments can also be implemented in a single embodiment in combination. On the contrary, various features described in the context of a single embodiment can also be implemented in multiple embodiments alone or in any suitable sub-combination.

Although the subject matter has been described in language specific to structural features and/or logical acts of methods, it should be understood that the subject matter defined in the appended claims is not necessarily limited to the specific features or acts described above. On the contrary, the specific features and actions described above are only example forms of implementing the claims.

What is claimed is:

1. A computer-implemented web page element style determination method, wherein, the method comprises, by one or more processors:
    acquiring a style file associated with a child element in a web page, wherein the style file associated with the child element comprises one or more of: a style file corresponding to the child element, a style file corresponding to a root element of the child element in the web page, and a style file corresponding to an element on an element chain between the child element and the root element in the web page;
    acquiring first style information corresponding to the child element from at least one or more of the style files;
    determining a target style information corresponding to the child element based on at least one or more the first style information,
    wherein the determining a target style information corresponding to the child element based on at least one or more the first style information, comprises:
    merging a plurality of the first style information level by level from the child element upwards based on the hierarchical relationship between the elements, to obtain the target style information corresponding to the child element; and
    wherein the method further comprises:
    acquiring second style information corresponding to the child element, wherein the second style information refers to a style information bound to the child element; and merging the second style information and the target style information, to obtain a new target style information,
    wherein the merging the second style information and the target style information, to obtain a new target style information, includes:
    determining the second style information as the new target style information if the style names of the second style information and the target style information are the same.

2. The method according to claim 1, wherein the merging a plurality of the first style information level by level from the child element upwards based on the hierarchical relationship between the elements, to obtain the target style information corresponding to the child element, comprises:
    in the process of merging a plurality of first style information level by level upwards, if the first style information with the same style name exists, determining the first style information in a specific style file as the target style information corresponding to the child element, wherein the specific style file refers to first style information included in a style file corresponding to an element in the element chain closest to the child element.

3. The method according to claim 1, wherein a style file corresponding to a child element refers to a style file bound to the child element; a style file corresponding to a root element refers to a style file bound to the root element; a style file corresponding to an element in an element chain refers to a style file bound to the element in the element chain.

4. An electronic device, wherein the electronic device comprises:
   one or more processors;
   storage device for storing one or more programs;
   wherein, the one or more programs, when executed by the one or more processors, cause the one or more processors to implement:
   acquiring a style file associated with a child element in a web page, wherein the style file associated with the child element comprises one or more of: a style file corresponding to the child element, a style file corresponding to a root element of the child element in a web page, and a style file corresponding to an element on an element chain between the child element and the root element in a web page;
   acquiring first style information corresponding to the child element from at least one or more of the style files;
   determining a target style information corresponding to the child element based on at least one or more the first style information,
   wherein the determining a target style information corresponding to the child element based on at least one or more the first style information, comprises:
   merging a plurality of the first style information level by level from the child element upwards based on the hierarchical relationship between the elements, to obtain the target style information corresponding to the child element,
   wherein, the one or more programs, when executed by the one or more processors, cause the one or more processors to further implement:
   acquiring second style information corresponding to the child element, wherein the second style information refers to a style information bound to the child element; and
   merging the second style information and the target style information, to obtain a new target style information,
   wherein the merging the second style information and the target style information, to obtain a new target style information, comprises:
   determining the second style information as the new target style information if the style names of the second style information and the target style information are the same.

5. The electronic device according to claim 4, wherein the merging a plurality of the first style information level by level from the child element upwards based on the hierarchical relationship between the elements, to obtain the target style information corresponding to the child element, comprises:
   in the process of merging a plurality of first style information level by level upwards, if the first style information with the same style name exists, determining the first style information in a specific style file as the target style information corresponding to the child element, wherein the specific style file refers to first style information included in a style file corresponding to an element in the element chain closest to the child element.

6. The electronic device according to claim 4, wherein a style file corresponding to a child element refers to a style file bound to the child element; a style file corresponding to a root element refers to a style file bound to the root element; a style file corresponding to an element in an element chain refers to a style file bound to the element in the element chain.

7. A non-transitory computer readable storage medium on which computer programs are stored, wherein the computer programs, when executed by a processor, cause the processor to implement:
   acquiring a style file associated with a child element in a web page, wherein the style file associated with the child element comprises one or more of: a style file corresponding to the child element, a style file corresponding to a root element of the child element in a web page, and a style file corresponding to an element on an element chain between the child element and the root element in a web page;
   acquiring first style information corresponding to the child element from at least one or more of the style files;
   determining a target style information corresponding to the child element based on at least one or more the first style information,
   wherein the determining a target style information corresponding to the child element based on at least one or more the first style information, comprises:
   merging a plurality of the first style information level by level from the child element upwards based on the hierarchical relationship between the elements, to obtain the target style information corresponding to the child element,
   wherein, the computer programs, when executed by the processor, cause the processor to further implement:
   acquiring second style information corresponding to the child element, wherein the second style information refers to a style information bound to the child element; and merging the second style information and the target style information, to obtain a new target style information,
   wherein the merging the second style information and the target style information, to obtain a new target style information, comprises:
   determining the second style information as the new target style information if the style names of the second style information and the target style information are the same.

8. The non-transitory computer readable storage medium according to claim 7, wherein the merging a plurality of the first style information level by level from the child element upwards based on the hierarchical relationship between the elements, to obtain the target style information corresponding to the child element, comprises:
   in the process of merging a plurality of first style information level by level upwards, if the first style information with the same style name exists, determining the first style information in a specific style file as the target style information corresponding to the child element, wherein the specific style file refers to first style information included in a style file corresponding to an element in the element chain closest to the child element.

9. The non-transitory computer readable storage medium according to claim 7, wherein a style file corresponding to a child element refers to a style file bound to the child element; a style file corresponding to a root element refers to a style file bound to the root element; a style file corresponding to an element in an element chain refers to a style file bound to the element in the element chain.

\* \* \* \* \*